US012761459B2

(12) United States Patent
Akashi

(10) Patent No.: US 12,761,459 B2
(45) Date of Patent: Oct. 13, 2026

(54) IMAGE ACQUISITION METHOD AND IMAGE ACQUISITION SYSTEM

(71) Applicant: CANON KABUSHIKI KAISHA, Tokyo (JP)

(72) Inventor: Kenichi Akashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/311,405

(22) Filed: Aug. 27, 2025

(65) Prior Publication Data

US 2026/0072264 A1 Mar. 12, 2026

(30) Foreign Application Priority Data

Sep. 6, 2024 (JP) ................................. 2024-154116

(51) Int. Cl.
*G02B 21/36* (2006.01)
*G06T 5/50* (2006.01)
*G06T 5/92* (2024.01)

(52) U.S. Cl.
CPC .............. *G02B 21/365* (2013.01); *G06T 5/50* (2013.01); *G06T 5/92* (2024.01); *G06T 2207/10056* (2013.01); *G06T 2207/10144* (2013.01); *G06T 2207/20212* (2013.01); *G06T 2207/30024* (2013.01)

(58) Field of Classification Search
CPC .... G02B 21/365; G02B 21/14; G02B 21/367; G06T 5/50; G06T 5/92; G06T 2207/10056; G06T 2207/10144; G06T 2207/20212; G06T 2207/30024
USPC ............................................................ 348/79
See application file for complete search history.

(56) References Cited

U.S. PATENT DOCUMENTS

| | | | | |
|---|---|---|---|---|
| 8,022,373 | B2 | 9/2011 | Maiya | |
| 9,749,546 | B2 * | 8/2017 | Matsunaga | G06T 5/50 |
| 10,976,534 | B2 * | 4/2021 | Steinmeyer | G02B 21/361 |
| 11,106,178 | B2 * | 8/2021 | Yamakawa | G01N 21/453 |
| 11,317,015 | B2 * | 4/2022 | Miyazawa | H04N 23/673 |
| 11,846,579 | B2 * | 12/2023 | Wong | B01L 9/00 |
| 2009/0159814 | A1 | 6/2009 | Maiya | |
| 2010/0026822 | A1 * | 2/2010 | Hahm | G06F 16/45 348/E5.024 |

(Continued)

FOREIGN PATENT DOCUMENTS

| | | | |
|---|---|---|---|
| JP | 2016-208854 | A | 12/2016 |
| JP | 2019-045877 | A | 3/2019 |
| WO | 2007/142339 | A1 | 12/2007 |

*Primary Examiner* — Helen Shibru
(74) *Attorney, Agent, or Firm* — Venable LLP

(57) ABSTRACT

Provided is an image acquisition method of acquiring, with respect to a sample including a cell in a fluid that is contained in a vessel, a phase contrast image picked up with use of an image pickup apparatus, the image acquisition method including: acquiring, when a target range of the sample for which the phase contrast image is to be acquired is divided into N areas, exposure acquisition images by picking up images of M areas out of the N areas, with M satisfying M<N; calculating appropriate exposure conditions with respect to the exposure acquisition images; determining exposure conditions for picking up images of the respective N areas; determining an image pickup order of the N areas; acquiring images-to-be-combined by picking up the images of the respective N areas; and combining the images-to-be-combined.

12 Claims, 9 Drawing Sheets

(56) References Cited

U.S. PATENT DOCUMENTS

| | | | | |
|---|---|---|---|---|
| 2015/0145983 | A1* | 5/2015 | Akashi | G02B 7/008<br>348/80 |
| 2020/0271913 | A1 | 8/2020 | Honda | |
| 2025/0336047 | A1* | 10/2025 | Chen | G06T 3/4038 |

* cited by examiner

IMAGE ACQUISITION METHOD AND IMAGE ACQUISITION SYSTEM

BACKGROUND

Field of the Technology

The present disclosure relates to an image acquisition method and an image acquisition system.

Description of the Related Art

In cell culture, progress of culture is sometimes observed with a microscope or the like. Cells are generally colorless and transparent, and observation of cells being grown is accordingly achieved by observing a phase contrast image with use of a phase contrast microscope. In observation with a phase contrast microscope, a range to be observed may not be contained in one field of view in some cases because an angle of view of a general phase contrast microscope is smaller than a planar dimension of a bottom of a culture vessel.

With regards to the foregoing, in International Publication No. WO2007/142339, there is described a method of acquiring a large-area image by acquiring images (hereinafter also referred to as "tile images") of small areas (hereinafter also referred to as "tiles") and combining those images (hereinafter also referred to as "tiling").

The related art has room for improvement in quick acquisition of a phase contrast image.

SUMMARY

The present disclosure has been made in view of the problem described above, and is directed to providing an image acquisition method and an image acquisition system which enable quick acquisition of a phase contrast image.

According to one aspect of the present disclosure, there is provided an image acquisition method of acquiring, with respect to a sample including a cell in a fluid that is contained in a vessel, a phase contrast image picked up by a phase contrast method with use of an image pickup apparatus, the image acquisition method including: acquiring, when a target range of the sample for which the phase contrast image is to be acquired is divided into N areas, N being an integer equal to or more than 3, exposure acquisition images by picking up images of M areas out of the N areas by the phase contrast method, M being an integer equal to or more than 2, with M satisfying M<N; calculating appropriate exposure conditions with respect to the exposure acquisition images; determining exposure conditions for picking up images of the respective N areas, based on positions of the M areas in the target range and on the appropriate exposure conditions with respect to the exposure acquisition images; determining an image pickup order of the N areas based on the exposure conditions for picking up the images of the respective N areas; acquiring images-to-be-combined by picking up the images of the respective N areas by the phase contrast method, based on the image pickup order and on the exposure conditions for picking up the images of the respective N areas; and combining the images-to-be-combined.

Features of the present disclosure will become apparent from the following description of embodiments with reference to the attached drawings. The following description of embodiments is described by way of example.

DESCRIPTION OF THE EMBODIMENTS

About Problem of Related Art

Figure 1:
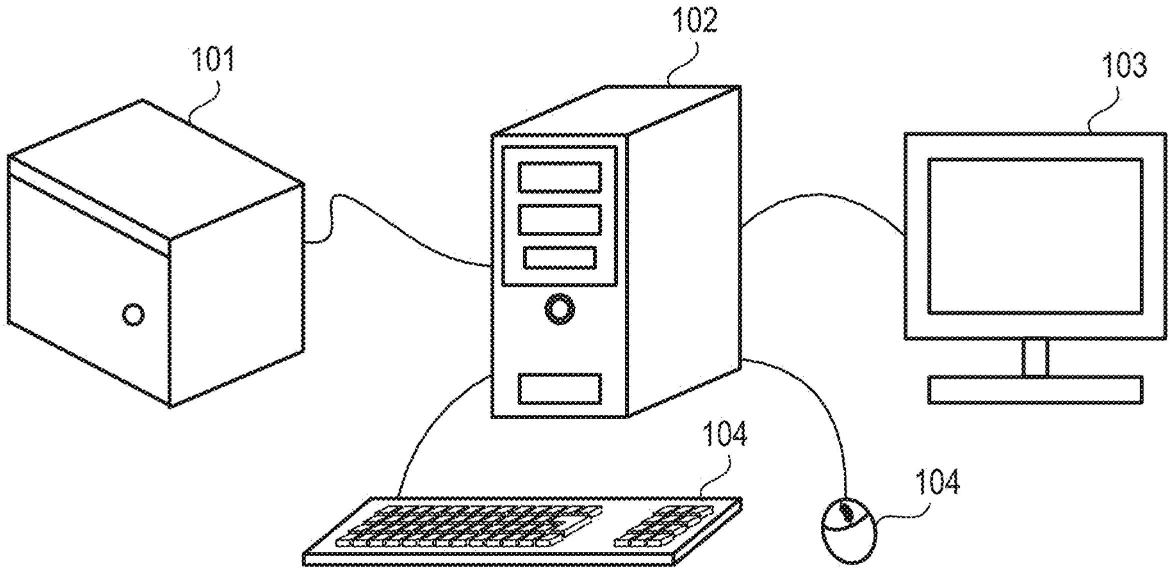
FIG. 1 is a schematic diagram for illustrating an overall configuration of apparatus according to a first embodiment.

With the method as described in International Publication No. WO2007/142339, there is a case in which one dynamic range of a camera is not enough to cover entirety of a range required to be observed, and an appropriate exposure condition is accordingly required to be set tile by tile. However, acquisition of a large-area image that includes tile-by-tile obtainment of an appropriate exposure condition has a problem in that the image acquisition takes long.

In addition, cells in the process of culture are in a culture fluid which is a fluid filling the culture vessel, and when the cells in the culture fluid are observed with a phase contrast microscope, a phenomenon in which an area around a wall portion of the culture vessel looks bright occurs. A possible cause of this phenomenon is a change brought to the phase contrast image by a change in optical distance due to a meniscus of the culture fluid and curvedness (flatness) of a bottom surface of the culture vessel. The fluid filling the culture vessel in observation with a phase contrast microscope may be any one of fluids of different uses, such as a culture fluid, a cell detachment solution, a cleaning fluid, and a buffer. The problem described above may occur also when the fluid filling the culture vessel is other than a culture fluid. A step in which cells are observed with a phase contrast microscope is not limited to the culture step, and may be a detachment step, a cleaning step, a drug addition step, or the like.

The phase contrast image changes depending on a configuration of the phase contrast microscope. Accordingly, the phenomenon described above cannot be dealt with by preparing a wide-angle-of-view (macro) observation system separate from an observation system for use in acquiring the tile images, and using the observation system to acquire a change in brightness.

Further, intensity and a range of the brightness that changes due to the phenomenon described above vary depending on a volume of the culture fluid and a shape of the vessel. The volume of the culture fluid fluctuates from one worker to another worker, and it is accordingly required to obtain an appropriate exposure condition by using an actual object itself of which an image is to be acquired.

The inventor of the present disclosure has found out, as a result of an extensive examination, quick determination of an appropriate exposure condition and acquisition of a large-area image is achieved by the following image acquisition methods according to embodiments of the present disclosure.

The image acquisition methods according to the embodiments of the present disclosure are an image acquisition method that acquires, for a sample including a cell that is in a fluid contained in a vessel, a phase contrast image picked up with use of an image pickup apparatus by a phase contrast method. The fluid contained in the vessel is not particularly limited, and may be any one of fluids of different uses, such as a culture fluid, a cell detachment solution, a cleaning fluid, and a buffer. The image acquisition methods according to the embodiments of the present disclosure include a step of acquiring exposure acquisition images, a step of calculating an exposure condition, a step of determining an exposure condition, a step of determining an image pickup order, a step of acquiring images-to-be-combined, and a step of combining the images-to-be-combined.

The exposure acquisition images are images acquired, when a target range of the above-mentioned sample for which the phase contrast image described above is to be acquired is divided into N areas, by picking up images of M areas out of the N areas by the phase contrast method, with M satisfying M<N. The symbol M represents an integer equal to or more than 2 because the M areas are used to obtain an exposure condition in each of the N areas by interpolation, details of which are described later. The symbol N represents an integer equal to or more than 3 because N satisfies the relationship "M<N." In the present disclosure, the exposure acquisition images mean images used to determine and acquire an appropriate exposure condition (exposure condition acquisition images).

The step of calculating an exposure condition is a step of calculating an appropriate exposure condition with respect to the exposure acquisition images described above.

The exposure condition in the step of determining an exposure condition is an exposure condition for picking up an image of each of the N areas based on positions of the M areas in the target range, and on the appropriate exposure condition with respect to the exposure acquisition images.

The image pickup order is an order of picking up images of the N areas based on the exposure condition for picking up an image of each of the N areas.

The images-to-be-combined are images acquired by picking up images of the respective N areas by the phase contrast method, based on the image pickup order and on the exposure condition for picking up an image of each of the N areas.

The image acquisition methods according to the embodiments of the present disclosure are applicable particularly preferably to a case in which the above-mentioned cell is a cell included in a sheet-like cell culture.

In recent years, in a field of regenerative medicine and cell medicine, attempts to graft a sheet-like cell culture (cell sheet) obtained by culturing cells in a sheet shape to an affected site have been made in order to repair a damaged tissue or the like. In a case of using adherent cells to manufacture a cell sheet, the cells are cultured in a sheet shape in, for example, a culture vessel filled with a culture fluid (culture medium), and are kept in the sheet shape when being detached and collected from a culture substrate.

The collected cell sheet may have wrinkles, a tear, a hole, or other breakages and, in order to identify causes thereof and improve yield, observing how cells are growing during culturing is demanded.

The cell sheet grows and spreads to the wall of the culture vessel, and it is accordingly required to observe the entire area of the culture vessel with a phase contrast microscope.

When a large-area image is acquired by the method of the related art by determining an appropriate exposure condition tile by tile, the image acquisition requires a long time. When the image acquisition takes long, damage on cells is a concern and the image acquisition is accordingly required to be as quick and efficient as possible.

Accordingly, the image acquisition methods according to the embodiments of the present disclosure are particularly suitable for acquisition of a cell sheet observation image.

Cells of which images are to be acquired by the image acquisition methods according to the embodiments of the present disclosure are not limited to the above-mentioned cell sheet, and may be, for example, a single cell that has been seeded, a group of cells before forming a sheet, or a clump of cells (a spheroid).

Exemplary embodiments of the present disclosure are described below with reference to the drawings. In the drawings, similar components or equivalent components are denoted by the same reference symbols and descriptions thereof may be omitted or simplified.

First Embodiment

FIG. 1 is a schematic diagram for illustrating an example of an apparatus configuration for acquiring a phase contrast image of cells which includes an image acquisition system according to a first embodiment of the present disclosure and an image pickup apparatus including a phase contrast microscope. The apparatus configuration illustrated in FIG. 1 is an example of an apparatus configuration for acquiring, as a high-resolution and large-size (wide-angle-of-view) digital image, a phase contrast image of a cell sheet in a culture vessel which is an object of image pickup. In the first embodiment, the object is a cell sheet and a target range for which a phase contrast image is to be acquired is accordingly a range that encompasses the entire area of the vessel.

The apparatus configuration illustrated in FIG. 1 includes an image pickup apparatus 101, a computer 102, a display apparatus 103, and input apparatus 104. The image pickup apparatus 101 and the computer 102 are connected to each other by a cable of a dedicated or general-purpose I/F. The computer 102 and the display apparatus 103 are connected to each other by a cable of a general-purpose I/F. The input apparatus 104 are connected to the computer 102.

Details of the image pickup apparatus 101 and the computer 102 are described later.

The display apparatus 103 is a display device using, for example, a liquid crystal, electro-luminescence (EL), or a cathode ray tube (CRT). The display apparatus 103 and the computer 102 may be integrated into a notebook PC.

The input apparatus 104 are apparatus for enabling a user to input an image pickup start command and the like, and include a keyboard, a mouse, a touch panel, and the like. A tablet or the like that integrates the display apparatus 103 and the input apparatus 104 into one unit may also be used.

Although description is given taking the illustrated configuration as an example in the first embodiment, a notebook PC that integrates the computer 102 and the display apparatus 103 into one unit or an apparatus that integrates all components into one unit, for example, may be used.

Figure 2A:
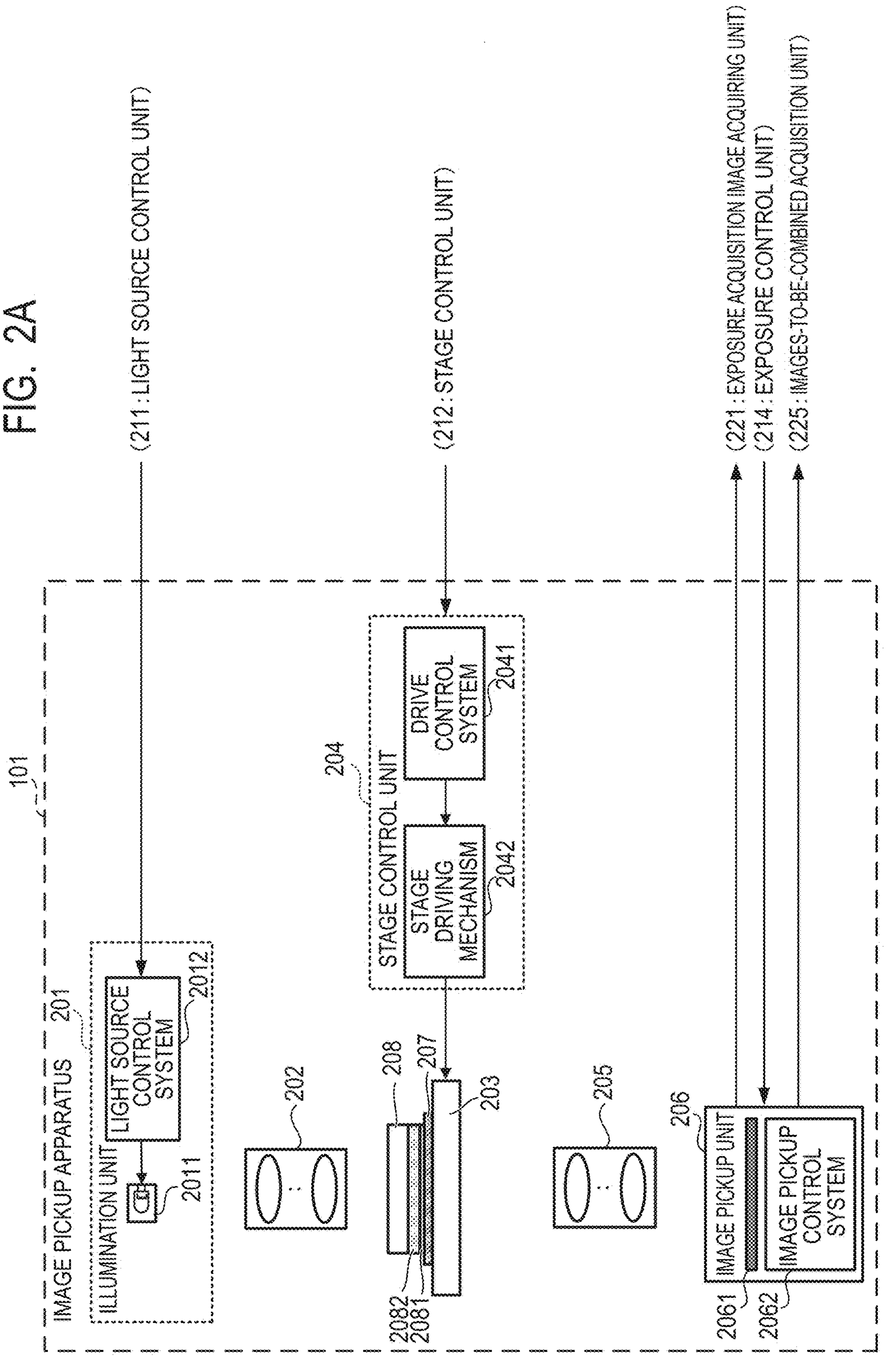
FIG. 2A is a block diagram for illustrating a function configuration in one among the apparatus according to the first embodiment.
Figure 2B:
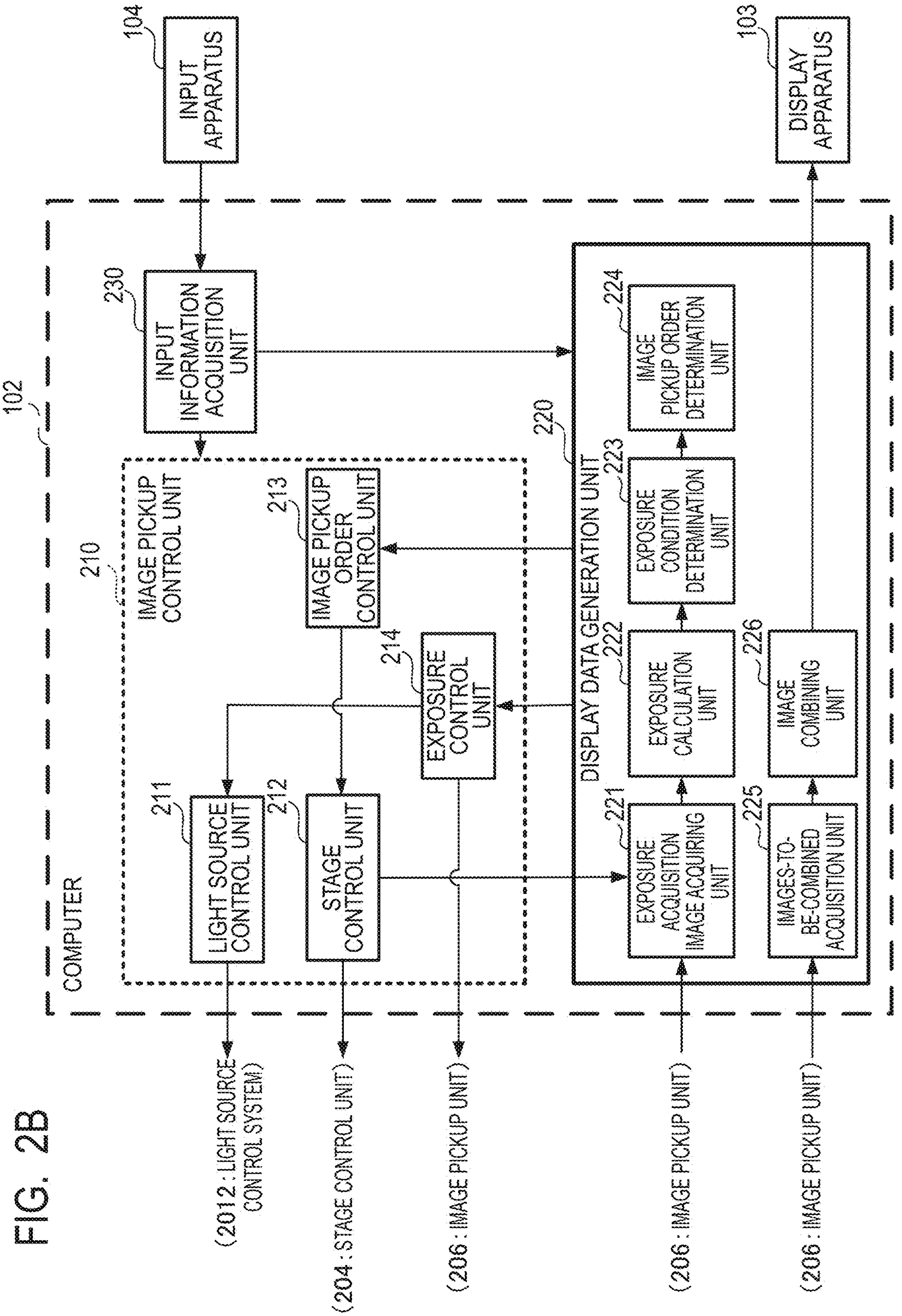
FIG. 2B is a block diagram for illustrating a function configuration in another one among the apparatus according to the first embodiment.

FIG. 2A is a schematic diagram for illustrating a function configuration in the image pickup apparatus 101, and FIG. 2B is a schematic diagram for illustrating a function configuration in the computer 102.

The image pickup apparatus 101 acquires image data of phase contrast images at a plurality of different points along two axes orthogonal to each other in a plane. The image pickup apparatus 101 includes an illumination unit 201, a phase contrast illumination optical system 202, a stage 203, a stage control unit 204, a phase difference detection optical system 205, and an image pickup unit 206.

The illumination unit 201 is used in combination with the phase contrast illumination optical system 202 as a measure to irradiate a cell sheet 2081 in a culture fluid 2082, which is contained in a culture vessel 208 placed on the stage 203, with light for phase contrast observation. The illumination unit 201 includes an illumination light source 2011 and a light source control system 2012. The light source control system 2012 receives an instruction from a light source control unit 211 to control the illumination light source 2011.

The stage 203 is, under drive control of the stage control unit 204, movable in an X-axis direction, a Y-axis direction, and a Z-axis direction, which are three axial directions orthogonal to one another.

A jig 207 for use in positioning the culture vessel 208 (hereinafter referred to as "positioning jig") is installed on the stage 203. The culture vessel 208 can be set on the stage 203 with good reproducibility by fitting the culture vessel 208 into a groove formed in the positioning jig 207.

The stage control unit 204 includes a drive control system 2041 and a stage driving mechanism 2042. The drive control system 2041 receives an instruction from a stage control unit 212 to execute drive control of the stage 203. The stage driving mechanism 2042 drives the stage 203 by following an instruction from the drive control system 2041.

The phase difference detection optical system 205 is an optical system used in combination with the phase contrast illumination optical system 202 to form a phase contrast image on a light receiving element surface of an image pickup sensor 2061 in the image pickup unit 206.

The image pickup unit 206 includes the image pickup sensor 2061 and an image pickup control system 2062, and picks up an image in accordance with an instruction received from an image pickup control unit 210. When a plane orthogonal to an optical axis is defined as an X-Y plane, as the stage 203 is driven in directions along the X-axis and the Y-axis, the image pickup unit 206 picks up tile images to acquire image data. The data of the tile images (hereinafter also referred to as "tile image data") acquired by the image pickup unit 206 is transmitted to a display data generation unit 220. The image pickup sensor 2061 is a two-dimensional image sensor which turns a two-dimensional optical image into an electrical physical quantity by photoelectric conversion, and uses, for example, a CCD or a CMOS device. The image pickup control system 2062 controls a sensitivity (for example, ISO sensitivity) and an exposure time of the image pickup sensor 2061, and execution of image pickup.

The computer 102 is an example of an apparatus that includes functions as an image processing system according to the embodiments of the present disclosure, and includes a central processing unit (CPU), a random access memory (RAM), a storage apparatus, a data input and output I/F, and an internal bus connecting those components to one another. As described above, the display apparatus 103 and the input apparatus 104 are connected to the computer 102.

A program according to one embodiment of the present disclosure is installed in the storage apparatus of the computer 102. The CPU operates in accordance with the program, to thereby execute respective processing procedures in the image pickup control unit 210, the display data generation unit 220, and an input information acquisition unit 230.

The image pickup control unit 210 includes the light source control unit 211, the stage control unit 212, an image pickup order control unit 213, and an exposure control unit 214.

The light source control unit 211 receives an instruction from the exposure control unit 214 to issue an instruction to the light source control system 2012 in the illumination unit 201 and thereby control brightness of the illumination light source 2011.

The stage control unit 212 issues an instruction to the drive control system 2041 of the stage control unit 204 to control a position of the stage 203.

The image pickup order control unit 213 issues an instruction to the stage control unit 212 based on an image pickup order list which is generated in an image pickup order determination unit 224 and which is described later, to control the order of picking up tile images.

The exposure control unit 214 issues instructions to the light source control unit 211 and to the image pickup control system 2062 in the image pickup unit 206 so that appropriate exposure is executed, based on an exposure condition determined by an exposure condition determination unit 223.

The display data generation module 220 includes an exposure acquisition image acquiring unit 221, an exposure calculation unit 222, the exposure condition determination unit 223, the image pickup order determination unit 224, an images-to-be-combined acquisition unit 225, and an image combining unit 226, and executes processing related to steps in the image acquisition methods according to the embodiments of the present disclosure.

The exposure acquisition image acquiring unit 221 acquires position information of the positioning jig 207 which is transmitted from the stage control unit 212, and exposure acquisition images transmitted from the image pickup unit 206. That is, the exposure acquisition images acquired by the exposure acquisition image acquiring unit 221 are associated with the position information of the positioning jig 207. The exposure acquisition images are tile images for exposure acquisition that are obtained by, when a target range of the culture vessel 208 for which a phase contrast image is to be acquired is divided into N areas, picking up images of M areas out of the N areas, with M satisfying $M<N$. The tile images for exposure acquisition are picked up by the phase contrast method with use of the image pickup apparatus 101, and the tile images for exposure acquisition transmitted from the image pickup unit 206 can also be displayed on the display apparatus 103.

The exposure calculation unit 222 determines an exposure state (appropriate, over-exposed, or under-exposed) of an image by analyzing the data of the exposure acquisition images acquired by the exposure acquisition image acquiring unit 221, and calculates an appropriate exposure condition with respect to the exposure acquisition images. The exposure state can be determined by, for example, a method of calculating a histogram of the data of the exposure acquisition images.

The exposure condition determination unit 223 determines an exposure condition for picking up an image of each of the N areas, based on positions of the M areas in the target range and the appropriate exposure condition with respect to the exposure acquisition images. The positions of the M areas in the target range are identifiable from the position information of the positioning jig 207 that is associated with the exposure acquisition images. The exposure condition determination unit 223 transmits information about the determined exposure condition to the exposure control unit 214.

The image pickup order determination unit 224 determines an order of picking up images of the N areas based on the exposure condition determined for each of the N areas by the exposure condition determination unit 223. The image pickup order determination unit 224 transmits information about the determined order of picking up images of the N areas to the image pickup order control unit 213.

The images-to-be-combined acquisition unit 225 acquires images to be combined (tile images to be combined) which are images of the N areas picked up by the phase contrast method. The images to be combined are images picked up by the image pickup apparatus 101 based on an instruction output from the exposure control unit 214 which is based on the information about the exposure condition, and on an instruction output from the image pickup order control unit 213 which is based on the information about the order of picking up images of the N areas.

After the images-to-be-combined acquisition unit 225 acquires data of all tile images to be combined, the image combining unit 226 combines those pieces of data to generate high-resolution and large-area (wide-angle-of-view) image data (combined image data). The combined image data is stored in the storage apparatus in the computer 102 and is also output to the display apparatus 103 on which a combined image is displayed.

The input information acquisition unit 230 receives information input from the user to the input apparatus 104, and issues an instruction to the image pickup control unit 210. The user inputs information via a graphical user interface (GUI) to set various settings. Examples of the settings in the first embodiment include a shape of the positioning jig 207, an initial set value of the light source control unit 211, and initial set values for the sensitivity and the exposure time of the image pickup sensor 2061.

Steps related to operation of the image pickup apparatus 101 and the computer 102 in the first embodiment are described with reference to flow charts illustrated in FIG. 3 to FIG. 6.

In the first embodiment, a culture vessel having a bottom surface that is substantially a precise circle is used as the culture vessel 208. Specific examples of the culture vessel 208 include a dish.

It is premised that coordinate values of the X-axis and the Y-axis of the stage 203 and a positional relationship with the culture vessel 208 are known through measurement that is executed separately when the positioning jig 207 is installed on the stage 203.

Figure 3:
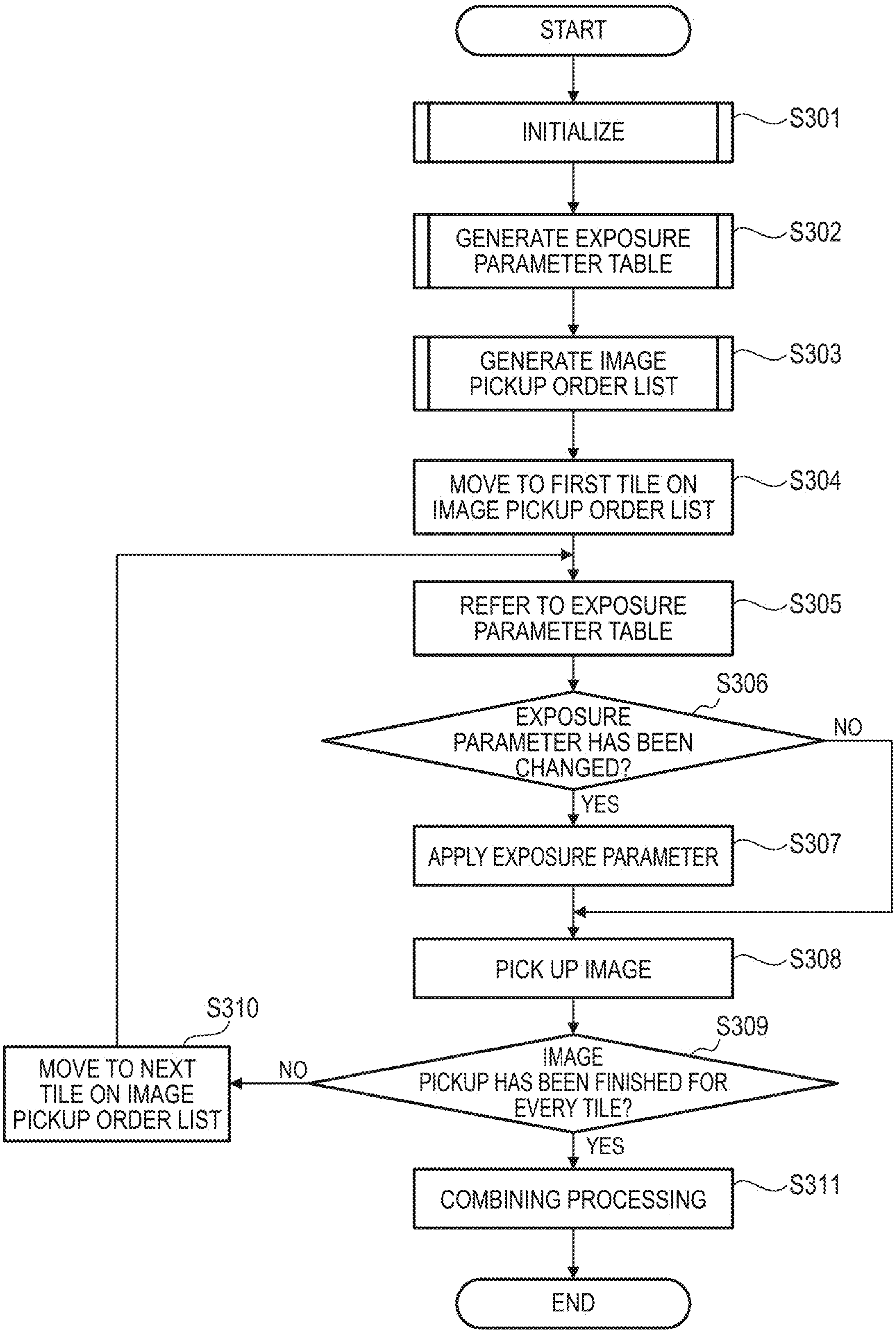
FIG. 3 is a flow chart for illustrating an overall flow of an image acquisition method according to the first embodiment.

FIG. 3 is a flow chart for illustrating an entire process.

In Step S301, initialization of the image pickup apparatus is executed. Steps related to the initialization of the image pickup apparatus are illustrated in the flow chart of FIG. 4.

In Step S401, the user inputs, via the input apparatus 104, image pickup condition information such as the information of the positioning jig 207, how large an area (a field of view) can be acquired with the image pickup unit 206, and an initial exposure time and an initial sensitivity of the image pickup sensor 2061. The input information is stored, via the input information acquisition unit 230, in the storage apparatus in the computer 102.

In Step S402, the input information acquisition unit 230 acquires the information input in Step S401, and transmits the information to the image pickup control unit 210 and the display data generation unit 220.

In Step S403, coordinate values of the X-axis and the Y-axis on the stage 203 are obtained for each tile from the information of the positioning jig 207 which has been acquired in Step S402. At the same time, the image pickup sensor 2061, the stage 203, the illumination light source 2011, and others are initialized.

In Step S302, an exposure parameter table is generated. To give an outline, the above-mentioned data of the exposure acquisition images (exposure acquisition image data) is acquired, and an interpolation formula for calculating a parameter for specifying a specific exposure condition (an exposure parameter) is obtained. For each of N tiles, an exposure parameter to be set in the tile is subsequently obtained, and the obtained exposure parameters are then output as an exposure parameter table. The exposure condition is preferred to include at least one selected from the group consisting of intensity (brightness) of the illumination light source 2011, the sensitivity of the image pickup sensor 2061, and the exposure time of the image pickup sensor 2061.

The above-mentioned phenomenon in which the brightness of the phase contrast image changes has a characteristic of being rotationally symmetric with respect to an axis that is a center of the bottom surface of the culture vessel 208 when the bottom surface of the culture vessel 208 is substantially a precise circle. The first embodiment utilizes the characteristic. Accordingly, when the above-mentioned tiles to be acquired are, for example, three tiles in length by three tiles in width, nine tiles in total (that is, N=9), an interpolation formula described later can be obtained by acquiring at least two pieces (that is, M=2) of exposure acquisition image data, and the parameter table can be created. That is, M is an integer equal to or more than 2, and N, which satisfies the relationship "M<N," is an integer equal to or more than 3. The first embodiment is not limited to this example, and M may be increased to a value more than 2 in light of granularity and a time required for acquisition. For example, when N is 15×15=225, M may be set to a value equal to or more than 2 and less than 7.

Figure 5:
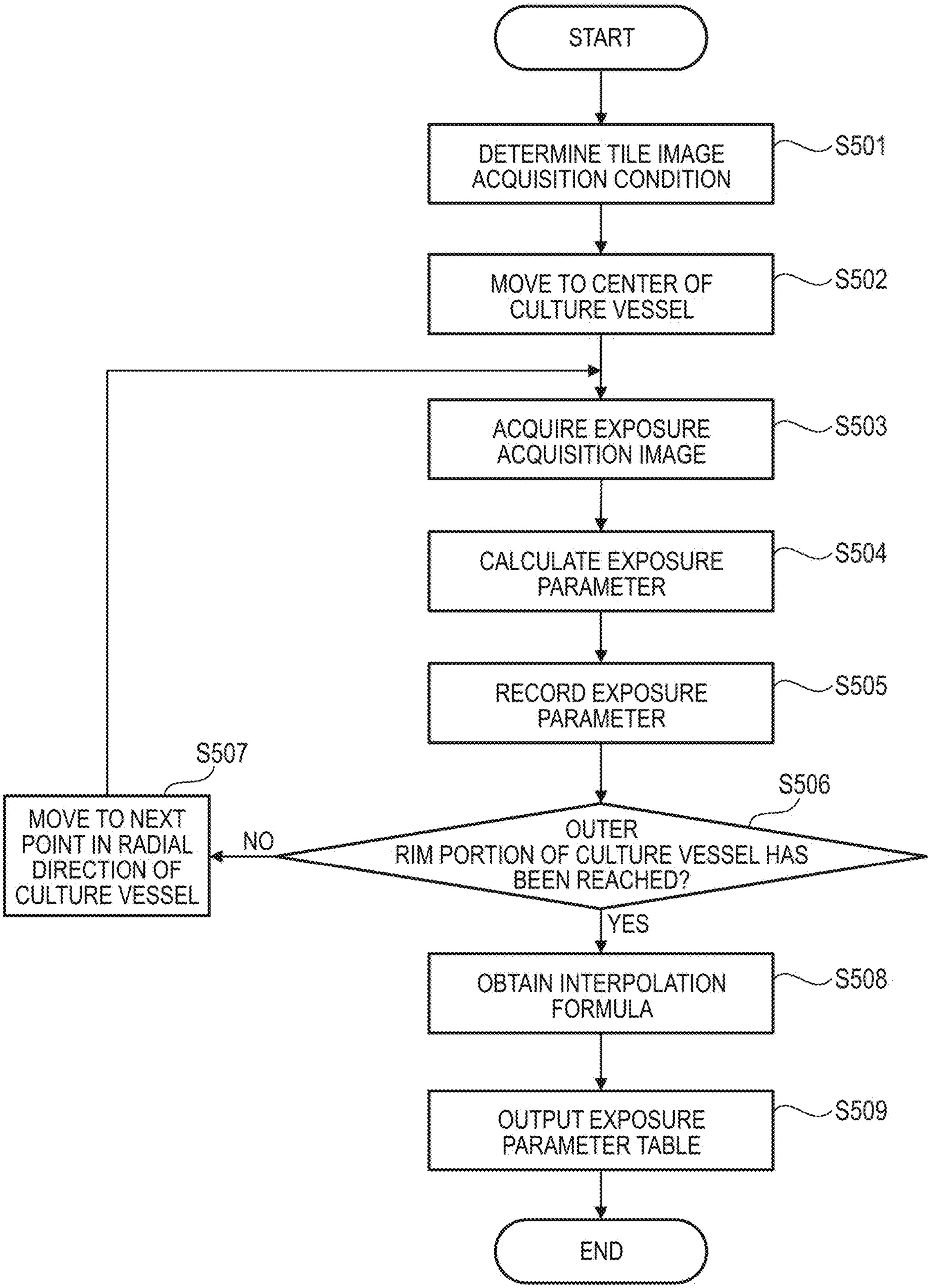
FIG. 5 is a flow chart for illustrating a flow of another part of the image acquisition method according to the first embodiment.

Steps related to the generation of the exposure parameter table are illustrated in FIG. 5. Of the steps illustrated in FIG. 5, Step S501 to Step S503 are steps included in an exposure acquisition image acquiring step executed in the exposure acquisition image acquiring unit 221. Step S504 to Step S507 are steps included in an exposure calculation step executed in the exposure calculation unit 222. Step S508 and Step S509 are steps included in an exposure condition determination step executed in the exposure condition determination unit 223.

In Step S501, the exposure acquisition image acquiring unit 221 determines conditions for acquiring the tile images for exposure acquisition and the tile images to be combined. Specifically, the value of the number N of all tiles to be acquired is determined in accordance with the information acquired in Step S402, from a planar dimension of the entire area of the vessel (a planar dimension of the entire bottom surface of the culture vessel 208) and from the field of view (FOV) of the image pickup apparatus 101. The number M of tile images for exposure acquisition is also determined. How the number M of tile images for exposure acquisition is determined is not particularly limited as long as the relationship "M<N" is satisfied. For example, the value of M may be determined automatically by the computer 102 by following a standard set in advance, or may be a value that is determined by the user in relation to the value of N and input from the input apparatus 104.

In Step S502, in order to acquire the first exposure acquisition image, the exposure acquisition image acquiring unit 221 instructs the image pickup order control unit 213 to move an image pickup field to a center of the culture vessel 208. The moving is achieved by driving the stage 203. A center position of the culture vessel 208 is determined based on the information of the positioning jig 207 which has been input in Step S401.

In Step S503, the exposure acquisition image picked up by the image pickup apparatus 101 is acquired.

In Step S504, the exposure calculation unit 222 calculates an exposure parameter that sets exposure to an appropriate level, based on data of the exposure acquisition image.

In Step S505, the exposure parameter calculated in Step S504 is recorded in the storage apparatus in the computer 102.

In Step S506, whether the image pickup field has reached an outer rim portion of the culture vessel 208 is determined. The process proceeds to Step S508 when it is determined that the outer rim portion has been reached, and proceeds to Step S507 when it is determined that the outer rim portion has not been reached. The determination on whether the outer rim portion of the culture vessel 208 has been reached is made by checking coordinates of the stage 203 at that moment against the information of the positioning jig 207 which has been input in Step S401.

In Step S507, the image pickup field is moved in a radial direction of the culture vessel 208 by a predetermined distance. The distance by which the image pickup field is to be moved can be determined based on, for example, a size of a range in which N tile images to be combined are acquired, and the value of M. The distance by which the image pickup field is to be moved may be constant, or may vary depending on the position of the tile image for exposure acquisition. The change in brightness of the phase contrast image in exposure acquisition images tends to be small in a central portion of the bottom surface of the vessel and increase as a distance to the vessel wall closes. This is utilized to take the exposure acquisition image data sparsely in the center portion and at a density that gradually increases as the distance to the wall closes. The time required for acquisition can thus be shortened with the granularity maintained.

After the image pickup field is moved in Step S507, the process returns to Step S503.

Step S508 is a step of obtaining, from the exposure acquisition image, an approximate function that represents a relationship between a position in a range in which an image of a sample is picked up and an exposure condition. In Step S508 in the first embodiment, the exposure parameter recorded in Step S505 is used to obtain an interpolation formula with respect to a radius of the culture vessel 208. When a distance from the center of the culture vessel 208 and the exposure parameter are represented by "r" and W(r), respectively, the interpolation formula can be a polynomial expression expressed as follows:

$$W(r)=a_n r^n+a_{n-1} r^{n-1}+ \dots +a_1 r+a_0$$

where "n" represents a natural number, $a_n$ is a coefficient of the polynomial expression and is obtained by a known method such as a least-square method. Although it depends on the value of M, "n" is preferred to be about 3 or about 4. The interpolation formula is not limited to a polynomial expression, and may be a known expression such as an exponential function, a trigonometric function, or a sigmoidal function. A suitable combination of those may also be used.

Step S509 is a step of determining an exposure condition for picking up an image of each of the N areas (tiles) with use of the approximate function obtained in Step S508. In Step S509, an exposure parameter to be set in each tile is calculated by the interpolation formula obtained in Step S508, and is output as an exposure parameter table. The output exposure parameter table is recorded in the storage apparatus in the computer 102.

In Step S303, an order of picking up images of the N areas (tiles to be combined) is determined based on the exposure condition (the exposure parameter table generated in Step S302) for picking up an image of each of the N areas. To give an outline, tiles in which similar exposure parameters are to be set are grouped by referring to the exposure parameter table, an order of picking up images of the groups is determined, and, for each group, an order of picking up images of the tiles in the group is further determined. The determined image pickup order is output as an image pickup order list.

Figure 6:
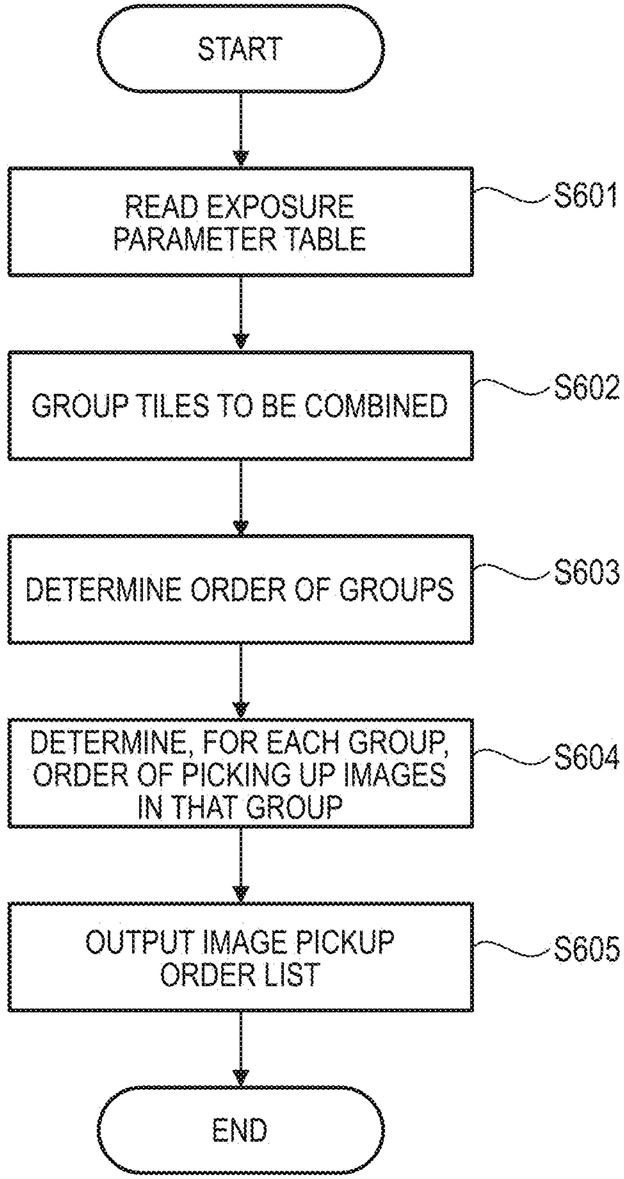
FIG. 6 is a flow chart for illustrating a flow of still another part of the image acquisition method according to the first embodiment.

Steps related to the determination of an image pickup order are illustrated in FIG. 6. The steps illustrated in FIG. 6 are executed in the image pickup order determination unit 224.

In Step S601, the exposure parameter table generated in Step S509 is acquired and read.

In Step S602, tiles to be combined that have similar exposure parameters are grouped by scanning the exposure parameter table. Examples of a method of grouping include cluster analysis performed by a known method such as K-means. In a case of using K-means, the number of clusters is three or more and is preferred to be as small as possible. At the time of grouping, it is preferred to give priority to the exposure time, the brightness of the illumination light source 2011, and the sensitivity of the image pickup sensor 2061 in the stated order. This is because the exposure time which directly affects the total time required for acquisition is preferred to be given top priority, and because switching the brightness of the illumination light source 2011 generally takes longer than changing the sensitivity of the image pickup sensor 2061. In Step S602, areas that share the same exposure condition out of the N areas may be grouped together.

In Step S603, an order of picking up images of the groups generated by the grouping in Step S602 is determined. It is preferred in Step S603 to determine an order of picking up images of the groups so as to minimize a sum of distances from one group to another group. In the first embodiment, the order is determined so that a group at the center of the bottom surface of the culture vessel 208 and a group in a circumferential portion of the bottom surface are placed first and last, respectively.

In Step S604, for each group, an order of picking up images of the areas included in the group is determined. It is preferred in Step S604 to determine, for each group, an image pickup order so that images of the areas (tiles to be combined) included in the group can be picked up in a unicursal manner. The image pickup order of the areas in the same group is preferred to be determined so as to minimize distances from one group to another group, based on the image pickup order of the groups which has been determined in Step S603.

In the first embodiment, it is preferred in Step S604 to determine an order of picking up images of the N areas so that a trajectory of the image pickup order of the N areas has a whorl shape. For the tiles to be combined in the group at the center of the bottom surface of the culture vessel 208, in particular, the image pickup order is determined so that the trajectory swirls out from the center.

In Step S605, an image pickup order list in which the order of picking up images of the tiles to be combined is written is output based on results of Step S603 and Step S604. The image pickup order list is recorded in the storage apparatus in the computer 102.

Step S304 to Step S310 are steps included in an images-to-be-combined acquisition step executed in the images-to-be-combined acquisition unit 225.

In Step S304, the stage 203 is driven to move the image pickup field to the tile of which an image is to be picked up first, based on the image pickup order list generated in Step S303.

In Step S305, an exposure parameter in the current tile is acquired by referring to the exposure parameter table generated in Step S302.

In Step S306, the exposure parameter acquired in Step S305 is compared to an exposure parameter that has been used in the picking up of an image of an immediately preceding tile on the image pickup order list. When it is found out that the exposure parameter has changed, the process proceeds to Step S307. In a case in which the exposure parameter has not changed, the process proceeds to Step S308.

In Step S307, the exposure parameter acquired in Step S305 is applied to the illumination unit 201 and the image pickup unit 206.

In Step S308, image pickup by the image pickup unit 206 is executed to acquire tile image data. The acquired tile image data is transmitted to the display data generation unit 220 as described above. Focusing may be executed immediately before the image pickup. Focusing is executable by a well-known method such as a method including detection of a contrast. The user may manually perform focusing.

In Step S309, whether image pickup has been executed for every tile to the last tile on the image pickup order list generated in Step S303 is determined. When it is determined that the image pickup has been executed to the last tile, the process proceeds to Step S311. When it is determined that execution has not reached the last tile, the process proceeds to Step S310.

In Step S310, the stage 203 is driven to move the image pickup field to the next tile, based on the image pickup order list generated in Step S303.

After the image pickup field is moved in Step S310, the process returns to Step S305.

Step S311 is a step included in an image combining step executed in the image combining unit 226. In Step S311, the pieces of tile image data acquired up to that point are combined to generate high-resolution and large-size (wide-angle-of-view) digital image data.

As described above, in the first embodiment, the exposure acquisition image data is acquired before acquisition of all pieces of tile image data, in order to calculate an exposure parameter so that exposure is at an appropriate level in every tile. A combined image can thus be acquired from phase contrast images quickly acquired with all tiles set to their respective appropriate exposure conditions.

Modification Example 1 of First Embodiment

In the first embodiment, a move to a tile of which an image is to be picked up is executed by driving the stage 203, but the method of moving the image pickup field is not limited thereto. For example, instead of using the stage 203, a jig or the like may be used to fix a three-dimensional position of the culture vessel 208. The illumination unit 201, the phase contrast illumination optical system 202, the phase difference detection optical system 205, and the image pickup unit 206 may then be moved as an integrated structure, to thereby acquire a tile image.

Modification Example 2 of First Embodiment

In the first embodiment, exposure parameters are calculated by obtaining an interpolation formula. However, in a case in which vessel shape variations are determined in advance, a method including referring to a plurality of tables that are calculated in advance may be employed. In this case, exposure parameters obtained from the exposure acquisition image data are checked against the tables, and the closest table is adopted as interpolated exposure parameters. A calculation time as well as memory and other resources for calculating the interpolation formula can thus be saved.

Second Embodiment

An overall apparatus configuration according to a second embodiment is the same as in the first embodiment, and description thereof is accordingly omitted.

Steps related to operation of the image pickup apparatus 101 and the computer 102 in the second embodiment are described with reference to flow charts of FIG. 7 and FIG. 8.

In the second embodiment, a culture vessel having a quadrangular bottom surface is used as the culture vessel 208. The shape of the bottom surface of the culture vessel 208 is not limited to a rectangular shape, and four corners may have any appropriate angles. The number of corners is also not limited to four, and the bottom surface shape may be any appropriate polygonal shape that has three or more corners. Specific examples of the culture vessel 208 include a flask and a tray.

It is premised that coordinate values of the X-axis and the Y-axis of the stage 203 and a positional relationship with the culture vessel 208 are known through measurement that is executed separately when the positioning jig 207 is installed on the stage 203.

In the second embodiment, an exposure parameter described later is an exposure time of the image pickup sensor 2061. As an exposure parameter, any one of or a combination of the brightness of the illumination light source 2011 and the sensitivity of the image pickup sensor 2061 may be used.

Figure 7:
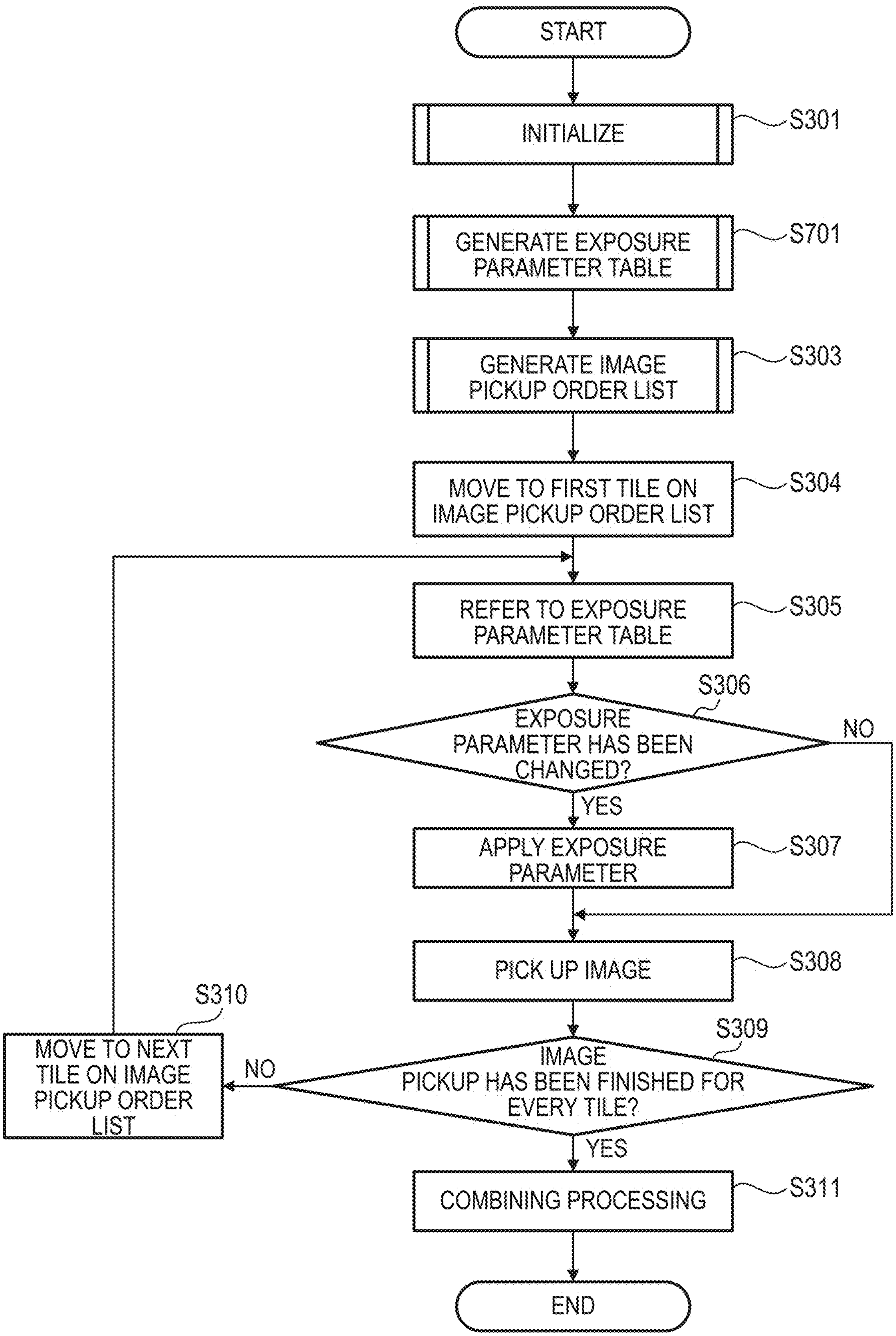
FIG. 7 is a flow chart for illustrating an overall flow of an image acquisition method according to a second embodiment.

A flow chart of an entire process is illustrated in FIG. 7.

Figure 4:
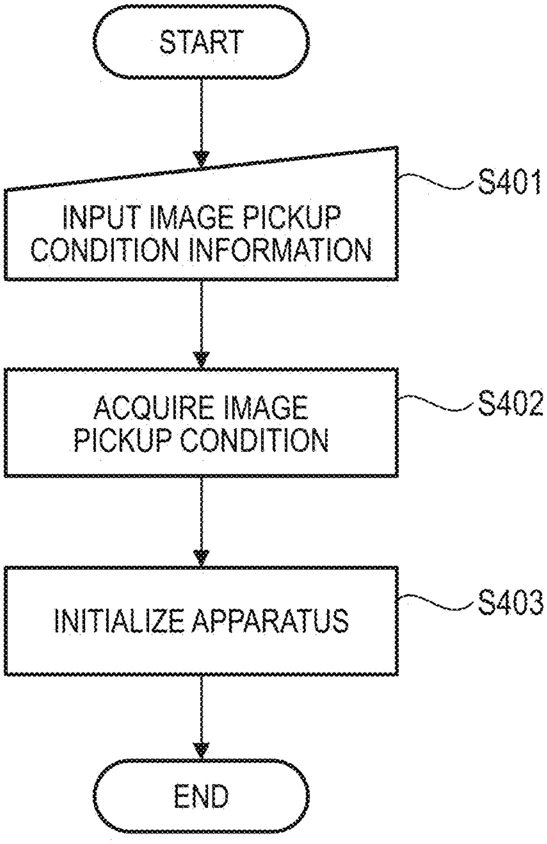
FIG. 4 is a flow chart for illustrating a flow of a part of the image acquisition method according to the first embodiment.

Initialization of the image pickup apparatus in Step S301 is the same as in the first embodiment, and is as illustrated in the flow chart of FIG. 4.

In Step S701, an exposure parameter table is generated. To give an outline, the exposure acquisition image data is acquired, a curved surface (exposure parameter surface) in a three-dimensional space for calculating exposure parameters is obtained, exposure parameters to be set in respective tiles are obtained, and then the obtained exposure parameters are output as an exposure parameter table.

Figure 8:
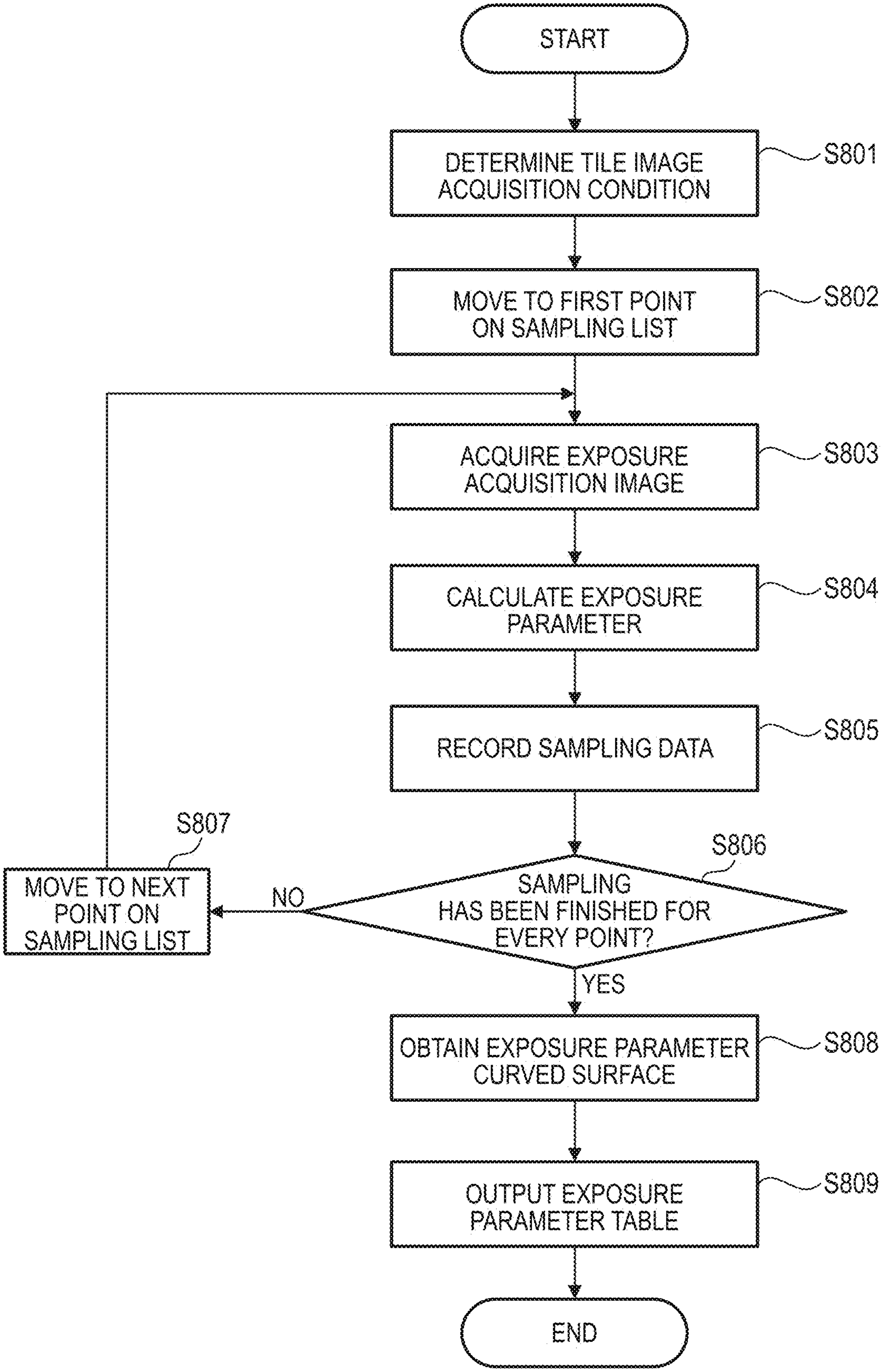
FIG. 8 is a flow chart for illustrating a flow of a part of the image acquisition method according to the second embodiment.

Steps related to the generation of the exposure parameter table are illustrated in FIG. 8. Of the steps illustrated in FIG. 8, Step S801 to Step S803 are steps included in the exposure acquisition image acquiring step executed in the exposure acquisition image acquiring unit 221. Step S804 to Step S807 are steps included in the exposure calculation step executed in the exposure calculation unit 222. Step S808 and Step S809 are steps included in the exposure condition determination step executed in the exposure condition determination unit 223.

In Step S801, the exposure acquisition image acquiring unit 221 determines conditions for acquiring the tile images for exposure acquisition and the tile images to be combined. Specifically, the value of the number N of all tiles to be acquired is determined first, in the same manner as that of Step S501 described above. The number M of points at which the tile images for exposure acquisition are sampled (hereinafter referred to as "sampling points") for acquiring information required to calculate the exposure parameter curved surface described above is determined, and the sampling points are organized into a list (hereinafter referred to as "sampling list"). As in the first embodiment, how the number M of tile images for exposure acquisition is determined is not particularly limited as long as the relationship "M<N" is satisfied. When the number of tiles to be acquired is, for example, three tiles in length by three tiles in width, nine tiles in total (that is, N=9), the exposure parameter curved surface can be obtained by acquiring five pieces in total (that is, M=5) of exposure acquisition image data at a center and corners of the bottom surface of the vessel. As in the first embodiment, the value of M may be increased or decreased in light of granularity and the time required for acquisition.

The sampling points may be determined based on the information of the positioning jig 207, or may be input by the user via the input apparatus 104. In a case of using the culture vessel 208 that is quadrangular as in the second embodiment, the center of the bottom surface of the culture vessel 208 and the corners of the bottom surface of the culture vessel 208 are recommended to be set as sampling points. For a higher granularity, any appropriate one or more points along the sides of the bottom surface of the culture vessel 208 may be set as sampling points in addition to the sampling points described above.

In Step S802, the image pickup field is moved to the first sampling point on the list by driving the stage 203, based on the sampling point list created in Step S801.

In Step S803, an exposure acquisition image picked up by the image pickup apparatus 101 is acquired.

In Step S804, the exposure calculation unit 222 calculates an exposure parameter at which exposure is at an appropriate level, based on data of the exposure acquisition image. As described above, an exposure parameter in the second embodiment is an exposure time of the image pickup sensor 2061.

In Step S805, sampling data is recorded. The sampling data is coordinate values defined by U, V, and W, U being an X coordinate value of the stage 203 at the sampling point, V being a Y coordinate value thereof, and W being an exposure parameter at which the level of exposure at the sampling point is appropriate. The sampling data is recorded in the storage apparatus in the computer 102.

In Step S806, whether the sampling data has been recorded at every sampling point on the sampling list described above is determined. In a case in which the recording has been finished for every sampling point, the process proceeds to Step S808. When there is a sampling point for which the recording is not finished, the process proceeds to Step S807.

In Step S807, the image pickup field is moved to the next sampling point by driving the stage 203, based on the sampling point list created in Step S801.

After the image pickup field is moved in Step S807, the process returns to Step S803.

In Step S808, the exposure parameter curved surface is obtained from the sampling data. The exposure curved surface is, when an X coordinate value and a Y coordinate value of the stage at a sampling point are represented by U and Y, respectively, and an exposure parameter at which the level of exposure at the sampling point is appropriate is represented by W, an approximate curved surface that passes close to all of the following coordinates.

$$(U_0,V_0,W_0),(U_1,V_1,W_1), \ldots ,(U_M,V_M,W_M)$$

The approximate curved surface can be obtained by a known method such as curved surface regression analysis. The approximate curved surface may also be obtained by assuming and applying a polynomial curved surface such as a paraboloidal surface. Other than the method in which a curved surface that passes all points is obtained at once, a method that obtains the approximate curved surface in two stages by obtaining two or more polynomials that pass a plurality of points and obtaining a curved surface that passes those polynomials may be used as well.

In Step S809, for each of the tiles to be combined, an exposure parameter to be set in the tile is calculated from the exposure parameter curved surface, and is output as an exposure parameter table. The output exposure parameter table is recorded in the storage apparatus in the computer 102.

Step S303 is the same as in the first embodiment and is executed in the manner of the flow chart illustrated in FIG. 6.

Step S304 to Step S311 are the same as in the first embodiment, and descriptions thereof are omitted.

As described above, in the second embodiment, an exposure parameter curved surface is obtained, and is used to calculate an exposure parameter at which the level of exposure is appropriate in each tile. A combined image can thus be acquired from phase contrast images quickly acquired with all tiles set to their respective appropriate exposure conditions.

Modification Example of Second Embodiment

In the second embodiment, the center of the bottom surface of the culture vessel 208 and the corners of the bottom surface of the culture vessel 208 are set as sampling points. However, when the bottom surface of the culture vessel 208 has a symmetrical shape, the above-mentioned change in brightness of the phase contrast image is symmetrical as well. Accordingly, when the bottom surface of the culture vessel 208 has a symmetrical shape, the exposure parameter curved surface can be obtained with fewer sampling points by sampling only one of symmetrical sides.

In the case of the example given above, when the tiles to be acquired are three tiles in length by three tiles in width, nine tiles in total (that is, N=9), it is sufficient to acquire exposure acquisition images at the center and corners on one side of the bottom surface of the vessel, and the number of exposure acquisition images to be acquired can thus be reduced to three in total (that is, M=3).

Other Embodiments

In the first embodiment and the second embodiment, the positional relationship between the stage 203 and the culture vessel 208 is guaranteed by the positioning jig 207. Instead of the positioning jig 207, a combination of, for example, an observation system with which the entirety of the stage 203 is observable (for example, a bright-field optical system and an image pickup apparatus) and image recognition may be used to obtain the positional relationship.

The functions of the first embodiment and the second embodiment are implemented as software installed in the computer 102. The same functions may be implemented as, for example, a dedicated board which uses a field-programmable gate array (FPGA) or the like and which is incorporated in the computer 102. The embodiments of the present disclosure may also be implemented by, for example, a circuit that implements one or more functions (for example, an ASIC).

In the first embodiment and the second embodiment, the image pickup apparatus 101 and the computer 102 are connected to each other by a cable of a dedicated or general I/F, but the Web (Internet) may be used instead to connect the two to each other. Further, the computer 102 in this case may be a virtual computer on a cloud network.

All of the above-mentioned embodiments merely describe embodied examples for carrying out the embodiments the present disclosure, and hence the technical scope of the present disclosure should not be interpreted in a limited way based on the above-mentioned embodiments. In other words, the present disclosure can be carried out in various forms without departing from the technical ideas or the main features thereof. For example, the object of the present disclosure may be achieved by combining the first embodiment and the second embodiment that have been described above and the other embodiments described above. That is, it should be understood that, for example, an embodiment in which part of the configuration of any of the embodiments is added to another embodiment or is replaced with part of the configuration of another embodiment is also an embodiment to which the present disclosure can be applied.

According to the embodiments of the present disclosure, the image acquisition method and the image acquisition system which enable quick acquisition of a phase contrast image are provided.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims the benefit of Japanese Patent Application No. 2024-154116, filed Sep. 6, 2024, which is hereby incorporated by reference herein in its entirety.

What is claimed is:

1. An image acquisition method of acquiring, with respect to a sample including a cell in a fluid that is contained in a vessel, a phase contrast image picked up by a phase contrast method with use of an image pickup apparatus, the image acquisition method comprising:

acquiring, when a target range of the sample for which the phase contrast image is to be acquired is divided into N areas, N being an integer equal to or more than 3, exposure acquisition images by picking up images of M areas out of the N areas by the phase contrast method, M being an integer equal to or more than 2, with M satisfying M<N;

calculating appropriate exposure conditions with respect to the exposure acquisition images;

determining exposure conditions for picking up images of the respective N areas, based on positions of the M areas in the target range and on the appropriate exposure conditions with respect to the exposure acquisition images;

determining an image pickup order of the N areas based on the exposure conditions for picking up the images of the respective N areas;

acquiring images-to-be-combined by picking up the images of the respective N areas by the phase contrast method, based on the image pickup order and on the exposure conditions for picking up the images of the respective N areas; and combining the images-to-be-combined.

2. The image acquisition method according to claim 1, further comprising obtaining, from the exposure acquisition images, an approximate function that indicates a relationship between a position in a range for which an image of the sample is picked up and an exposure condition, wherein the approximate function is used to determine, for each of the N areas, an exposure condition for picking up an image of the area.

3. The image acquisition method according to claim 1, wherein the cell is a cell included in a sheet-like cell culture.

4. The image acquisition method according to claim 1, wherein the target range includes an entire area of the vessel.

5. The image acquisition method according to claim 1, wherein a value of N is determined from a planar dimension of an entire area of the vessel and a field of view (FOV) of the image pickup apparatus.

6. The image acquisition method according to claim 1, wherein the exposure conditions each include at least one selected from the group consisting of an exposure time, a sensitivity of an image pickup sensor, and an intensity of an illumination light source.

7. The image acquisition method according to claim 1, wherein the determining of the image pickup order of the N areas includes:

grouping areas out of the N areas that share the same exposure condition together;

determining an order of picking up images of groups generated by the grouping; and determining, for each of the groups, an order of picking up images of the areas included in the group.

8. The image acquisition method according to claim 7, wherein, in the determining of the image pickup order of the N areas, the order of picking up the images of the groups is determined so as to minimize a sum of distances from one group to another group.

9. The image acquisition method according to claim 7, wherein, in the determining of the image pickup order of the N areas, for each of the groups, the order of picking up the images of the areas included in the group is determined so that the images of the areas are picked up in a unicursal manner.

10. The image acquisition method according to claim 1, wherein, in the determining of the image pickup order of the N areas, the image pickup order of the N areas is determined so that a trajectory of the image pickup order of the N areas has a whorl shape.

11. A non-transitory storage medium having stored thereon a program for causing a computer to execute the image acquisition method of claim 1.

12. An image acquisition system, which is configured to acquire, with respect to a sample including a cell in a fluid that is contained in a vessel, a phase contrast image picked up by a phase contrast method with use of an image pickup apparatus, the image acquisition system comprising:

an exposure acquisition image acquiring unit configured to acquire, when a target range of the sample for which the phase contrast image is to be acquired is divided into N areas, N being an integer equal to or more than 3, exposure acquisition images by picking up images of M areas out of the N areas by the phase contrast method, M being an integer equal to or more than 2, with M satisfying M<N;

an exposure calculation unit configured to calculate appropriate exposure conditions with respect to the exposure acquisition images;

an exposure condition determination unit configured to determine exposure conditions for picking up images of the respective N areas, based on positions of the M areas in the target range and on the appropriate exposure conditions with respect to the exposure acquisition images;

an image pickup order determination unit configured to determine an image pickup order of the N areas based on the exposure conditions for the respective N areas;

an images-to-be-combined acquisition unit configured to acquire images-to-be-combined by picking up the images of the respective N areas by the phase contrast method, based on the image pickup order and on the exposure conditions for the respective N areas; and an image combining unit configured to combine the images-to-be-combined.

* * * * *